(12) United States Patent  
Juillard

(10) Patent No.: US 9,026,563 B2  
(45) Date of Patent: May 5, 2015

(54) MECHANISM FOR FACILITATING DYNAMIC SOCIAL MEDIA-BASED MANAGEMENT OF ASSETS IN AN ON-DEMAND SERVICES ENVIRONMENT

(71) Applicant: salesforce.com, inc., San Francisco, CA (US)

(72) Inventor: Loic Juillard, Novato, CA (US)

(73) Assignee: salesforce.com, inc., San Francisco, CA (US)

( * ) Notice: Subject to any disclaimer, the term of this patent is extended or adjusted under 35 U.S.C. 154(b) by 0 days.

(21) Appl. No.: 13/841,340

(22) Filed: Mar. 15, 2013

(65) Prior Publication Data

US 2014/0025424 A1    Jan. 23, 2014

Related U.S. Application Data

(63) Continuation-in-part of application No. 13/552,518, filed on Jul. 18, 2012, now Pat. No. 8,996,588.

(60) Provisional application No. 61/594,233, filed on Feb. 2, 2012.

(51) Int. Cl.
| | |
|---|---|
| *G06F 17/30* | (2006.01) |
| *G06F 7/00* | (2006.01) |
| *G06Q 10/06* | (2012.01) |
| *G06Q 30/02* | (2012.01) |
| *G06Q 10/10* | (2012.01) |

(52) U.S. Cl.  
CPC .......... *G06Q 10/06316* (2013.01); *G06Q 30/02* (2013.01); *G06Q 10/10* (2013.01); *G06F 17/30893* (2013.01)

(58) Field of Classification Search  
USPC .......................................................... 707/803  
See application file for complete search history.

(56) References Cited

U.S. PATENT DOCUMENTS

| | | |
|---|---|---|
| 5,577,188 A | 11/1996 | Zhu |
| 5,608,872 A | 3/1997 | Schwartz et al. |
| 5,649,104 A | 7/1997 | Carleton et al. |
| 5,715,450 A | 2/1998 | Ambrose et al. |
| 5,761,419 A | 6/1998 | Schwartz et al. |
| 5,819,038 A | 10/1998 | Carleton et al. |
| 5,821,937 A | 10/1998 | Tonelli et al. |
| 5,831,610 A | 11/1998 | Tonelli et al. |

(Continued)

OTHER PUBLICATIONS

Oracle® Enterprise Asset Management, User's Guide, Release 11i, Jul. 2002 Oracle® .*

(Continued)

*Primary Examiner* — Kuen Lu  
(74) *Attorney, Agent, or Firm* — Blakely, Sokoloff, Taylor & Zafman

(57) ABSTRACT

In accordance with embodiments, there are provided mechanisms and methods for facilitating dynamic management of assets in an on-demand services environment. In one embodiment and by way of example, a method includes receiving, in real-time, a request for performance of one or more tasks relating to management of assets. The management of assets may include management of data relating to the assets, where the assets may include hardware assets or software assets, wherein the request is received at a first computing system. The method may further include performing, in real-time, the one or more tasks. The one or more tasks may include dynamically customizing, according to the request, data relating to the assets.

24 Claims, 11 Drawing Sheets

(56) References Cited

U.S. PATENT DOCUMENTS

| | | |
|---|---|---|
| 5,873,096 A | 2/1999 | Lim et al. |
| 5,918,159 A | 6/1999 | Fomukong et al. |
| 5,963,953 A | 10/1999 | Cram et al. |
| 6,092,083 A | 7/2000 | Brodersen et al. |
| 6,169,534 B1 | 1/2001 | Raffel et al. |
| 6,178,425 B1 | 1/2001 | Brodersen et al. |
| 6,189,011 B1 | 2/2001 | Lim et al. |
| 6,216,135 B1 | 4/2001 | Brodersen et al. |
| 6,233,617 B1 | 5/2001 | Rothwein et al. |
| 6,266,669 B1 | 7/2001 | Brodersen et al. |
| 6,295,530 B1 | 9/2001 | Ritchie et al. |
| 6,324,568 B1 | 11/2001 | Diec |
| 6,324,693 B1 | 11/2001 | Brodersen et al. |
| 6,336,137 B1 | 1/2002 | Lee et al. |
| D454,139 S | 3/2002 | Feldcamp |
| 6,367,077 B1 | 4/2002 | Brodersen et al. |
| 6,393,605 B1 | 5/2002 | Loomans |
| 6,405,220 B1 | 6/2002 | Brodersen et al. |
| 6,434,550 B1 | 8/2002 | Warner et al. |
| 6,446,089 B1 | 9/2002 | Brodersen et al. |
| 6,535,909 B1 | 3/2003 | Rust |
| 6,549,908 B1 | 4/2003 | Loomans |
| 6,553,563 B2 | 4/2003 | Ambrose et al. |
| 6,560,461 B1 | 5/2003 | Fomukong et al. |
| 6,574,635 B2 | 6/2003 | Stauber et al. |
| 6,577,726 B1 | 6/2003 | Huang et al. |
| 6,601,087 B1 | 7/2003 | Zhu et al. |
| 6,604,117 B2 | 8/2003 | Lim et al. |
| 6,604,128 B2 | 8/2003 | Diec |
| 6,609,150 B2 | 8/2003 | Lee et al. |
| 6,621,834 B1 | 9/2003 | Scherpbier et al. |
| 6,654,032 B1 | 11/2003 | Zhu et al. |
| 6,665,648 B2 | 12/2003 | Brodersen et al. |
| 6,665,655 B1 | 12/2003 | Warner et al. |
| 6,684,438 B2 | 2/2004 | Brodersen et al. |
| 6,711,565 B1 | 3/2004 | Subramaniam et al. |
| 6,724,399 B1 | 4/2004 | Katchour et al. |
| 6,728,702 B1 | 4/2004 | Subramaniam et al. |
| 6,728,960 B1 | 4/2004 | Loomans |
| 6,732,095 B1 | 5/2004 | Warshavsky et al. |
| 6,732,100 B1 | 5/2004 | Brodersen et al. |
| 6,732,111 B2 | 5/2004 | Brodersen et al. |
| 6,754,681 B2 | 6/2004 | Brodersen et al. |
| 6,763,351 B1 | 7/2004 | Subramaniam et al. |
| 6,763,501 B1 | 7/2004 | Zhu et al. |
| 6,768,904 B2 | 7/2004 | Kim |
| 6,782,383 B2 | 8/2004 | Subramaniam et al. |
| 6,804,330 B1 | 10/2004 | Jones et al. |
| 6,826,565 B2 | 11/2004 | Ritchie et al. |
| 6,826,582 B1 | 11/2004 | Chatterjee et al. |
| 6,826,745 B2 | 11/2004 | Coker et al. |
| 6,829,655 B1 | 12/2004 | Huang et al. |
| 6,842,748 B1 | 1/2005 | Warner et al. |
| 6,850,895 B2 | 2/2005 | Brodersen et al. |
| 6,850,949 B2 | 2/2005 | Warner et al. |
| 7,250,862 B2 | 7/2007 | Bornhoevd et al. |
| 7,327,248 B2 | 2/2008 | Odenwald et al. |
| 7,331,527 B2 | 2/2008 | Mo et al. |
| 7,340,411 B2 | 3/2008 | Cook |
| 7,378,962 B2 | 5/2008 | Odenwald et al. |
| 7,395,195 B2 | 7/2008 | Suenbuel et al. |
| 7,620,655 B2 | 11/2009 | Larsson et al. |
| 7,737,857 B2 | 6/2010 | Ebert et al. |
| 7,765,105 B2 | 7/2010 | Mo |
| 7,860,968 B2 | 12/2010 | Bornhoevd et al. |
| 8,131,838 B2 | 3/2012 | Bornhoevd et al. |
| 8,296,413 B2 | 10/2012 | Bornhoevd et al. |
| 2001/0044791 A1 | 11/2001 | Richter et al. |
| 2002/0022986 A1 | 2/2002 | Coker et al. |
| 2002/0029161 A1 | 3/2002 | Brodersen et al. |
| 2002/0029376 A1 | 3/2002 | Ambrose et al. |
| 2002/0035577 A1 | 3/2002 | Brodersen et al. |
| 2002/0042264 A1 | 4/2002 | Kim |
| 2002/0042843 A1 | 4/2002 | Diec |
| 2002/0072951 A1 | 6/2002 | Lee et al. |
| 2002/0082892 A1 | 6/2002 | Raffel et al. |
| 2002/0129352 A1 | 9/2002 | Brodersen et al. |
| 2002/0140731 A1 | 10/2002 | Subramaniam et al. |
| 2002/0143997 A1 | 10/2002 | Huang et al. |
| 2002/0152102 A1 | 10/2002 | Brodersen et al. |
| 2002/0161734 A1 | 10/2002 | Stauber et al. |
| 2002/0162090 A1 | 10/2002 | Parnell et al. |
| 2002/0165742 A1 | 11/2002 | Robins |
| 2003/0004971 A1 | 1/2003 | Gong et al. |
| 2003/0018705 A1 | 1/2003 | Chen et al. |
| 2003/0018830 A1 | 1/2003 | Chen et al. |
| 2003/0066031 A1 | 4/2003 | Laane |
| 2003/0066032 A1 | 4/2003 | Ramachandran et al. |
| 2003/0069936 A1 | 4/2003 | Warner et al. |
| 2003/0070000 A1 | 4/2003 | Coker et al. |
| 2003/0070004 A1 | 4/2003 | Mukundan et al. |
| 2003/0070005 A1 | 4/2003 | Mukundan et al. |
| 2003/0074418 A1 | 4/2003 | Coker |
| 2003/0088545 A1 | 5/2003 | Subramaniam et al. |
| 2003/0120675 A1 | 6/2003 | Stauber et al. |
| 2003/0151633 A1 | 8/2003 | George et al. |
| 2003/0159136 A1 | 8/2003 | Huang et al. |
| 2003/0187921 A1 | 10/2003 | Diec |
| 2003/0189600 A1 | 10/2003 | Gune et al. |
| 2003/0191743 A1 | 10/2003 | Brodersen et al. |
| 2003/0204427 A1 | 10/2003 | Gune et al. |
| 2003/0206192 A1 | 11/2003 | Chen et al. |
| 2003/0225730 A1 | 12/2003 | Warner et al. |
| 2004/0001092 A1 | 1/2004 | Rothwein et al. |
| 2004/0010489 A1 | 1/2004 | Rio |
| 2004/0015981 A1 | 1/2004 | Coker et al. |
| 2004/0027388 A1 | 2/2004 | Berg et al. |
| 2004/0128001 A1 | 7/2004 | Levin et al. |
| 2004/0186860 A1 | 9/2004 | Lee et al. |
| 2004/0193510 A1 | 9/2004 | Catahan, Jr. et al. |
| 2004/0199489 A1 | 10/2004 | Barnes-Leon et al. |
| 2004/0199536 A1 | 10/2004 | Barnes-Leon et al. |
| 2004/0199543 A1 | 10/2004 | Braud et al. |
| 2004/0249854 A1 | 12/2004 | Barnes-Leon et al. |
| 2004/0260534 A1 | 12/2004 | Pak et al. |
| 2004/0260659 A1 | 12/2004 | Chan et al. |
| 2004/0268299 A1 | 12/2004 | Lei et al. |
| 2005/0050555 A1 | 3/2005 | Exley et al. |
| 2005/0091098 A1 | 4/2005 | Brodersen et al. |
| 2005/0246342 A1 | 11/2005 | Vernon |
| 2010/0306305 A9 | 12/2010 | Carlson et al. |
| 2010/0312597 A1* | 12/2010 | Ellisor, Jr. ............... 705/7 |
| 2011/0289184 A1* | 11/2011 | Wolinsky et al. ............. 709/217 |
| 2012/0023199 A1 | 1/2012 | Holden et al. |
| 2012/0030424 A1 | 2/2012 | Nunez et al. |
| 2012/0046982 A1* | 2/2012 | Wellman ............... 705/7.12 |

OTHER PUBLICATIONS

Office Action for U.S. Appl. No. 13/552,518 mailed Jun. 10, 2013, 11 pages.

Final Office Action for U.S. Appl. No. 13/552,518 mailed Oct. 28, 2013, 16 pages.

Oracle® Enterprise Asset Management, User's Guide, Release 11i, Jul. 2002 Oracle®, 422 pages.

Office Action for U.S. Appl. No. 13/552,518 mailed Jul. 21, 2014, 21 pages.

* cited by examiner

Tech Asset Detail

[Edit] [Delete] [Clone] [Sharing]

| | | | |
|---|---|---|---|
| Asset Name | 84585-I / CCXFJS1 / na2-apc2-1 | Record Type | Tech Ops Asset Management [Change] |
| Asset Number | 845854 | Asset Type | TABERNUS - Enterprise Erase - E800 |
| Serial Number (TechOps) | CCXFJS1 | | |
| Device Name | na2-apc2-1 | Device Height | |
| Asset Type: Category | COMPUTER | Device Length | |
| Asset Type: Asset Type | HD MGMT | Device Width | |
| Asset Type: Manufacturer | TABERNUS | Device in Lbs. | |
| Asset Type: Make | Enterprise Erase | | |
| Asset Type: Model | E800 | | |
| Parent Asset Tag | | | |
| MAC Address | | | |
| DRAC MAC Address | | | |
| SVC State | STORAGE | | |
| Comments | | | |
| Assignment | | | |
| | PDU | | |

▼ Location Information

| | | | |
|---|---|---|---|
| Location: City | Chicago | Asset Location | Chicago - CHI - POD9 - POD9 - J11 |
| Location: Facility | CHI | | |
| Location: Colo | POD9 | | |
| Location: Cage Room | POD9 | | |
| Location: Rack Number | J11 | | |
| RackUPos | | | |

▼ Data Center Engineering: Host & Port Information

| | | | |
|---|---|---|---|
| OOB Host | ○ | OOB Port | ○ |
| IB Host | ○ | IB Port | ○ |
| Switch Port 1 | ○ | Switch Port 1 | ○ |
| Switch Port 2 | ○ | Switch Port 2 | ○ |
| Switch Port 3 | ○ | Switch Port 3 | ○ |
| Switch Port 4 | ○ | Switch Port 4 | ○ |

FIG. 2C

▼ Acquisition Information

| | | | |
|---|---|---|---|
| PO number | CDXDJS1 | Owning Department Code | |
| PID | 21212 | Net Purchase Price | |
| Project Name | | Monthly COst | |
| Acquisition Type | Operating Lease | Upgrade POS | |
| Lease Number | | Disposal Type | |
| Lease Start Date | | Hard drive(s) wiped | |
| Lease End Date | | EOL Status | |
| InSvcDT | | EOL Status Comments | |
| Buy Out Date | | | |
| Retired Date | | | |

▼ Support Information

| | | | |
|---|---|---|---|
| RMA number | | SupContract | |
| RMA Cause | | Support Code | |
| | | Support Phone | |
| | | Support End Date | |

▼ COA Information

| | | | |
|---|---|---|---|
| COA Received | | COA Submitted | |
| Received COA From | | Initialed COA sent to | |
| COA Verified | | COA executed | |
| COA Verified By | | COA Notes | |

▼ About

| | | | |
|---|---|---|---|
| Created By | Loic Juillard, 6/13/2012 2:50 PM | Data Source | Mobile Scanner iPhone 4S |
| Last Modified By | John Ko, 6/28/2012 7:43 AM | Process Type | Verify |
| | | Owner | ☐ Loic Juillard [Change] |

FIG. 2D

MECHANISM FOR FACILITATING DYNAMIC SOCIAL MEDIA-BASED MANAGEMENT OF ASSETS IN AN ON-DEMAND SERVICES ENVIRONMENT

CLAIM OF PRIORITY

This application is a continuation-in-part of U.S. patent application Ser. No. 13/552,518, filed Jul. 18, 2012, entitled "Mechanism for Facilitating Dynamic Management of Assets in an On-Demand Service Environment," by John Ko, et al., which claims the benefit of U.S. Provisional Patent Application No. 61/594,233, entitled "Methods and Systems for Managing Assets in an On-Demand Services Environment" by John Ko, filed Feb. 2, 2012.

COPYRIGHT NOTICE

A portion of the disclosure of this patent document contains material, which is subject to copyright protection. The copyright owner has no objection to the facsimile reproduction by anyone of the patent document or the patent disclosure, as it appears in the Patent and Trademark Office patent file or records, but otherwise reserves all copyright rights whatsoever.

TECHNICAL FIELD

One or more implementations relate generally to data management and, more specifically, to a mechanism for facilitating dynamic management of assets in an on-demand services environment.

BACKGROUND

Information technology (IT) asset management (AM) that involves management of hardware assets and software assets is well known. For example, management of hardware assets may include managing computers and hardware components of computers and computer networks, etc., from their acquisition through disposal. Similarly, management of software assets includes managing software packages, licenses, endpoints (versions and installed), etc., from their acquisition through disposal. However, today's asset management systems are not user-friendly as they are difficult to access and cumbersome to maintain.

The subject matter discussed in the background section should not be assumed to be prior art merely as a result of its mention in the background section. Similarly, a problem mentioned in the background section or associated with the subject matter of the background section should not be assumed to have been previously recognized in the prior art. The subject matter in the background section merely represents different approaches.

BRIEF DESCRIPTION OF THE DRAWINGS

In the following drawings like reference numbers are used to refer to like elements. Although the following figures depict various examples, one or more implementations are not limited to the examples depicted in the figures.

FIGS. 2C and 2D illustrate asset management details according to one embodiment;

DETAILED DESCRIPTION

Figure 1:
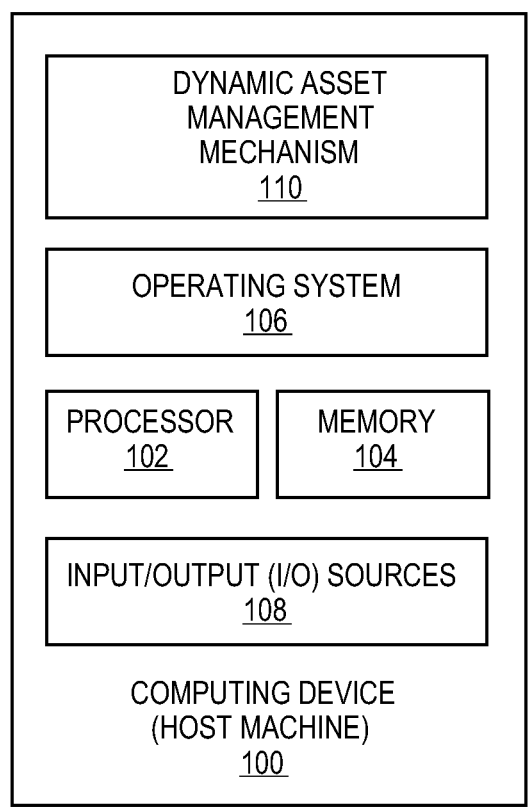
FIG. 1 illustrates a computing device employing a dynamic asset management mechanism according to one embodiment.

Methods and systems are provided for facilitating dynamic management of assets in an on-demand services environment. In one embodiment and by way of example, a method includes receiving, in real-time, a request for performance of one or more tasks relating to management of assets. The management of assets may include management of data relating to the assets, where the assets may include hardware assets or software assets, wherein the request is received at a first computing system. The method may further include performing, in real-time, the one or more tasks. The one or more tasks may include dynamically customizing, according to the request, data relating to the assets.

Embodiments provide a dynamic asset management mechanism that facilitates flexible, customized, and real-time management of data relating to assets, such as computer hardware and software assets. In one embodiment, the dynamic asset management mechanism provides the ability to the manage information technology information library (ITIL)-defined objectives of an asset management process which is to manage an asset's lifecycle as well as to provide perspective on, for example, the financial costs of an asset. Lifecycle refers to where an asset is in the process from its pre-deployment, to being storage, to being active, to being retired and/or disposed.

Throughout this document, the terms "management of assets" or "asset management" may refer to managing of data (e.g., logical data, financial data, lifecycle data, etc.) relating to assets. Such data, for example, may include, but is not limited to, who owns an asset, the cost of an asset, leasing terms relating to an asset, information regarding whether an asset has been disposed and/or retired, asset acquisition information, etc. In one embodiment, the management of assets is user-friendly where a user (e.g., end-user, an administrator, data center engineer, IT manager, etc.) at an organization/customer (e.g., a company or corporation, a government agency, an academic institution, a non-profit organization, etc.) may manage their assets remotely via a mobile computing device (e.g., a smartphone, a tablet computer, a laptop computer, etc.) and asset database updates may be provided via a social media environment. In one embodiment, the asset database management environment can selectively post updates based on user/account profile information.

For example, an administer may include someone with an ability to perform various processes, such as by scanning barcodes at various life stages of asset management, etc., while a data center engineer may include someone with an ability to perform life cycle processes except for financial, lease and support details and having an ability to perform various processes of life stages of asset management. An end-user may include a read-only user, such as someone with an ability to read, export, run reports, etc.

In one embodiment, using dynamic asset management mechanism a novel mobile platform-based asset management application (e.g., iOS-powered) for asset management using a point of sale (PoS) scanner to populate a cloud environment is provided. Asset management database updates may be provided to one or more recipients using social media posts/feeds (e.g., Chatter, Twitter, instant message, Facebook, Google+). In one embodiment, Chatter is a social media mechanism that provides a real-time collaboration platform for users. In one embodiment, Chatter has an associated service that sends information proactively via a real-time news stream that allows users to follow coworkers and data to receive broadcast updates about project and customer status and users can also form groups and post messages on each other's profiles to collaborate on projects. Chatter is provided by salesforce.com of San Francisco, Calif. Twitter is an online social networking service and that allows users to send and read text-based messages of up to 140 characters, known as "tweets". Twitter is provided by Twitter, Inc. of San Francisco, Calif.

Instant messaging (IM) is a form of communication over the Internet that offers quick transmission of text-based messages from sender to receiver. In push mode between two or more people using personal computers or other devices, along with shared clients, instant messaging offers real-time direct written language-based online chat. The user's text is conveyed over a network, such as the Internet. It may address point-to-point communications as well as multicast communications from one sender to many receivers. More advanced instant messaging allows enhanced modes of communication, such as live voice or video calling, video chat and inclusion of hyperlinks to media.

Current asset management solutions use proprietary, purpose built scanners for inventory using windows Mobile, they are do not populate cloud environment and are not as customizable as embodiments to define, for example, icons for processes, and do not provide useful updates, etc.

Embodiments are not limited to inventory hardware and software assets and that it includes ITIL asset management that includes logical data management, financial data management (e.g., cost, lease, status, etc.), and lifecycle stage data management may also be handled in a similar manner. In one embodiment, the mobile platform-based asset management application, using an on-demand environment, provides, but is not limited to, (1) a modern mobile platforms (e.g., iOS), (2) customizable mobile client using a cloud-side configuration, application manifest, wherein (3) customizability allows for disjoining of form presentation from mobile processes, and/or (4) a mechanism to provide customizable updates via social media platforms.

Further, in some embodiment, the mobile device's scanning mechanism may be used to scan barcodes of managed assets at various stages lifecycle, such as birth, mid-life, and end-life of asset management. Further, in some embodiments, the management of assets may be performed in real-time, updated dynamically, and customized per, for example, the needs and desires of an organization along with updates to social media feeds/posts/etc. The birth stage, for example, of the various stages relating to asset management of hardware and/or software assets may include one or more of receiving, configuring, leasing life, deploying and inventorying of an asset. Similarly, the mid-life stage includes one or more of moving, auditing, verifying, transferring and changing of an asset, while the end-life stage includes one or more of an asset's return merchandise authorization (RMA), disposal, etc.

For example, social media updates may be provided for certain parties at the beginning of the various stages, and for other parties, more detailed and/or frequent updates may be provided. The type and/or frequency of these updates may be based on, for example, a user's profile, preferences and/or privilege level. Other factors/parameters may also be utilized.

In one embodiment, the dynamic asset management mechanism supports various uses or functionalities of asset management, such as one or more of procurement, software license management, inventory management, capital and expense budgeting, client lifecycle management, regulatory compliance, asset lifecycle management, and the like. Further, in one embodiment, the dynamic assets management mechanism may further support one or more of receiving an inventory of assets, installation and provisioning, asset searching and reporting, periodic inventory updating and auditing, lease reporting and management, and the like.

Some or al of this information may be communicated to one or more parties utilizing social media mechanisms. Further, different levels/amounts of information may be provided to different parties. Embodiments provide for one or more of reducing of costs relating to asset management by optimizing asset utilization, increasing productivity by reducing time taken to deploy and manage assets, decreasing errors by providing accurate and up-to-date asset data, easing contract management by knowing lease/warranty status of assets, and the like.

Implementation of some embodiments may represent or include an application of a general mobile operating system components, such as a Point of Sale (PoS) scanner and a mobile phone to a dedicated application as an extension of a cloud-based asset management application. Implementation of some embodiments may further represent or include a thin client approach upon which no intelligence or configuration is resident on the mobile client. The definition may include processes, fields, icons, etc., that serve as residents in a file hosted by the cloud service that is dynamically updated when needed by the mobile application. Implementation of some embodiments may further represent or include a decoupling of the web presentation of asset details and the modeling of the processes on the mobile client. It may allow for a more tailored and process directed approach to mobile interaction and can be custom-made or tailored to suit a customer's needs.

As used herein, a term multi-tenant database system refers to those systems in which various elements of hardware and software of the database system may be shared by one or more customers. For example, a given application server may simultaneously process requests for a great number of customers, and a given database table may store rows for a potentially much greater number of customers. As used herein, the term query plan refers to a set of steps used to access information in a database system.

Embodiments are described with reference to an embodiment in which techniques for facilitating management of data in an on-demand services environment are implemented in a system having an application server providing a front end for an on-demand database service capable of supporting multiple tenants, embodiments are not limited to multi-tenant databases nor deployment on application servers. Embodiments may be practiced using other database architectures, i.e., ORACLE®, DB2® by IBM and the like without departing from the scope of the embodiments claimed.

Next, mechanisms and methods for dynamic management of assets in an on-demand services environment having a multi-tenant database system will be described with reference to example embodiments.

FIG. 1 illustrates a computing device 100 employing a dynamic asset management mechanism 110 according to one embodiment. In one embodiment, computing device 100 serves as a host machine employing a dynamic asset management mechanism ("AM mechanism") 110 to facilitate dynamic and real-time management of assets (e.g., computer hardware assets, computer software assets, etc.) that is mobile, user-friend, customizable, and flexible. Computing device 100 may include mobile computing devices, such as cellular phones including smartphones (e.g., iPhone®, BlackBerry®, etc.), handheld computing devices, personal digital assistants (PDAs), etc., tablet computers (e.g., iPad®, Samsung® Galaxy Tab®, etc.), laptop computers (e.g., notebooks, netbooks, Ultrabook™, etc.), e-readers (e.g., Kindle®, Nook®, etc.), Global Positioning System (GPS)-based navigation systems, etc. Computing device 100 may also include server computers, desktop computers, cluster-based computers, set-top boxes (e.g., Internet-based cable television set-top boxes, etc.), and the like.

Computing device 100 includes an operating system (OS) 106 serving as an interface between any hardware or physical resources of the computing device 100 and a user. Computing device 100 further includes one or more processors 102, memory devices 104, network devices, drivers, or the like, as well as input/output (I/O) sources 108, such as touchscreens, touch panels, touch pads, virtual or regular keyboards, virtual or regular mice, etc. It is to be noted that terms like "node", "computing node", "client", "client device", "server", "server device", "machine", "host machine", "device", "computing device", "computer", "computing system", "multi-tenant on-demand data system", and the like, may be used interchangeably and synonymously throughout this document. It is to be further noted that terms like "application", "software application", "program", "software program", "package", and "software package" may be used interchangeably and synonymously throughout this document.

Figure 2A:
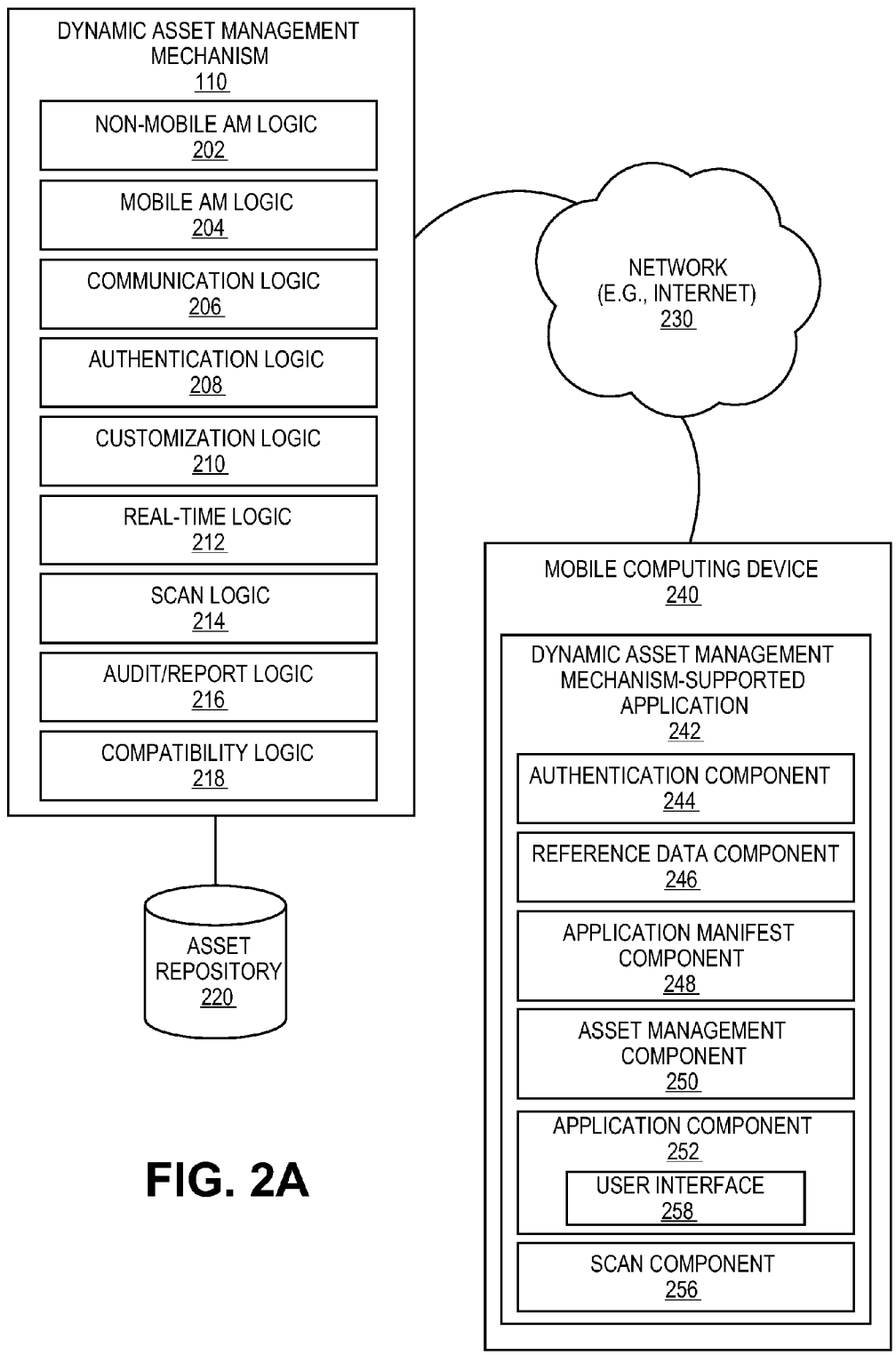
FIG. 2A illustrates a dynamic asset management mechanism according to one embodiment.

FIG. 2A illustrates a dynamic asset management mechanism 110 according to one embodiment. In one embodiment, dynamic management of assets (e.g., computer hardware assets, computer software assets, etc.) is facilitated using any combination of the components of the dynamic asset management mechanism 110 residing a first computing device (e.g., a server computer, such as a cloud-based server computer), such as computing device 100 of FIG. 1, and/or a dynamic asset management mechanism-supported application ("remote AM application) 242 remotely residing at a second computing device 240 (e.g., a mobile computer, such as a smartphone, a tablet computer, a laptop computer, etc.). Asset management tasks referred to in this document may include, but are not limited to, scanning one or more assets, adding one or more assets, updating one or more assets, verifying one or more assets, creating, reading and/or editing description of assets and AM-related processes, queuing of requests, viewing the queue and fixing errors, troubleshooting, and the like.

Further, verifying, creating, reading and/or editing description of assets may include, for example, information related to, or associated with, the asset. As one example, a truck identifier (e.g., number, description, picture) may be associated with an asset when the asset is on the truck for delivery. As another example, the same type of information may be provided for personnel authorized to handle/deliver/process the asset. These are just two simple examples and man other types of information may also be associated with the asset and provided utilizing social media mechanisms. It is to be noted that terms like "logic", "component", and "module" may be used interchangeably and synonymously and include one or more of hardware, software, and firmware or any combination thereof.

In one embodiment, AM mechanism 110 includes any number and type of components 202-218, such as non-mobile AM logic 202 and mobile AM logic 204 to recognize whether a computing device attempting to connect to or use the AM mechanism 110 is a mobile device, such as mobile device 240, or a non-mobile device so that AM mechanism 110 may perform various asset management task, accordingly. In this document, the focus is placed on connecting to AM mechanism 110 via mobile device 240 so that the mobile use of AM mechanism 110 to perform dynamic asset management may be better described, but it is contemplated that AM mechanism 110 is no way limited to mobile devices and that a user may connect via another form of a computing device, such as desktop computer, etc.

Upon recognizing that mobile device 240 is attempting to contact AM mechanism 110 over a network (e.g., Internet, such as over a cloud network), communication logic 206 facilitates a bi-directional communication between AM mechanism 110 and mobile AM mechanism 242 by triggering authentication logic 208 to authenticate one or more of the mobile device 240, the user of the mobile device 240, and various credentials relating to mobile AM mechanism 242. Once the authentication process is completed, in one embodiment, the user may have the mobility to perform various asset management tasks by using various features of AM mechanism 110 via his/her mobile device 240 having mobile AM mechanism 242. An asset repository 220 may be used to store various hardware and software assets.

For example and in one embodiment, customization logic 210 may be used to customize any information relating to the user's assets at the asset repository 220; for example, the user may want to receive customized notifications or warnings regarding certain assets (such as receiving a reminder regarding an asset after a predetermined time period has expired or an upgrade of the asset is due or upon disposing of an asset, or the like). These notifications may be received via direct notification and/or social media mechanisms through, for example, feeds, streams, posts, etc.

In one embodiment, any number and type of tasks (such as the aforementioned customization of assets) may be performed in real-time as facilitated by real-time logic 212. Furthermore, AM mechanism 110 includes audit/report logic 216 to perform any number of audits of assets stored at asset repository 220 as well as generate any number and types of reports regarding the assets. Some or all of this information may be communicated to appropriate parties via traditional notification mechanisms and/or social media mechanisms through, for example, feeds, streams, posts, etc. Compatibility logic 218 allows AM mechanism 110 to stay compatible with mobile AM mechanism 242, various and changing computing devices, such as mobile device 240, networks, such as network 230, asset repositories, such as asset repository 220, and other changing technologies, standards, and protocols.

On the mobile device side, in one embodiment, mobile AM application 242 includes authentication component 244 that is responsible for logging the user into mobile AM application 242 and verifying that all user actions are executed proper credentials. Authentication component 244 may work with authentication logic 208 of AM mechanism 110 at the server computer to perform the necessary authentication processes. It is contemplated that once the user and/or mobile device 240 are authenticated by authentication logic 208, there may be other local authentication processes that may be performed by authentication component 244, such as verifying user's login credentials, permission or authorization to access records relating to certain assets, and the like.

Mobile AM mechanism 242 further includes a reference data component that provides reference data that includes the lookup data for asset objects that are required for pick-lists. In one embodiment, the reference data may be extracted from an asset object's field metadata and cached locally for performance reasons. In one embodiment, application manifest component 248 of mobile AM mechanism 242 facilitates fetching, parsing, and displaying of various asset management processes and their fields at the mobile device 240. As with the reference data, the application manifest is also cached and stored locally when the application starts up at mobile device 240. Asset management component 250 of mobile AM mechanism 242 is used to facilitate creating, updating, and reading of an asset and information relating to assets during any number of AM processes being performed by AM mechanism 110. Further, asset management component 250 may be responsible for encapsulating service calls to the server computer employing AM mechanism 110 by managing an internal queue of requests and asynchronously sending them to AM mechanism 110.

In one embodiment, application component 252 may contain user interface elements, controllers, etc., for various mobile computing device models. Application component 252 may provide a user interface 258 for allowing the user to compose and coordinate various service providers into a cohesive application, such as mobile AM mechanism 242, for the user. For example, the user may order real-time, dynamic and customizable performance of asset management of assets at asset repository 220 using the user interface 258.

In one embodiment, a sub-mechanism to facilitate scanning is employed using scan component 256 at mobile AM mechanism 242 and scan logic 214 at AM mechanism 110. In one embodiment, the scan component 256 allows the user to use a scanner employed by mobile device 240 to scan, for example, barcodes on various assets so information relating to assets may be obtained. Information may include, but is not limited to, asset type, asset manufacturer, asset model, asset weight, asset dimensions, asset category, asset price, asset rent cost, city and/or country where the asset is scanned or being shipped, etc., date of scanning, expiration date, and the like.

Scanning component 256 may be implemented using a combination of a scanner interface and a mobile device-based scanning implementation (e.g., a LineaProScanner implementation). It is contemplated that the implementation may be generic enough to allow for the use of different types of existing and future scanners and employ various upgrades to scanner at mobile device 240, while compatibility logic 218 allows for AM mechanism 110 to work with different types of existing and future scanners. In one embodiment, a mobile device scanner may be used to scan any of the aforementioned asset information in real-time and runtime, leading to various AM tasks being performed in real-time and runtime.

With regard to scanning, a single scan may be used in situations where a single asset is to be identified, such as when a single asset update or updating of a single scannable asset is to be performed. The single scan may also be used during a bulk scan of assets if the user wishes to be prompted for additional data in between scans. Further, continuous scanning may be used during a bulk scan when none of the assets require any manual updates. The scanner may be turned on and used to identify various assets to which the bulk update is to be applied.

It is contemplated that any number and type of components may be added to and/or removed from AM mechanism 110 and/or mobile AM mechanism 242 to facilitate various embodiments including adding, removing, and/or enhancing certain features. For brevity, clarity, and ease of understanding of the AM and mobile AM mechanisms 110, 242 many of the standard and/or known components, such as those of a computing device, are not shown or discussed here. It is contemplated that embodiments are not limited to any particular technology, topology, system, architecture, and/or standard and are dynamic enough to adopt and adapt to any future changes.

Figure 2B:
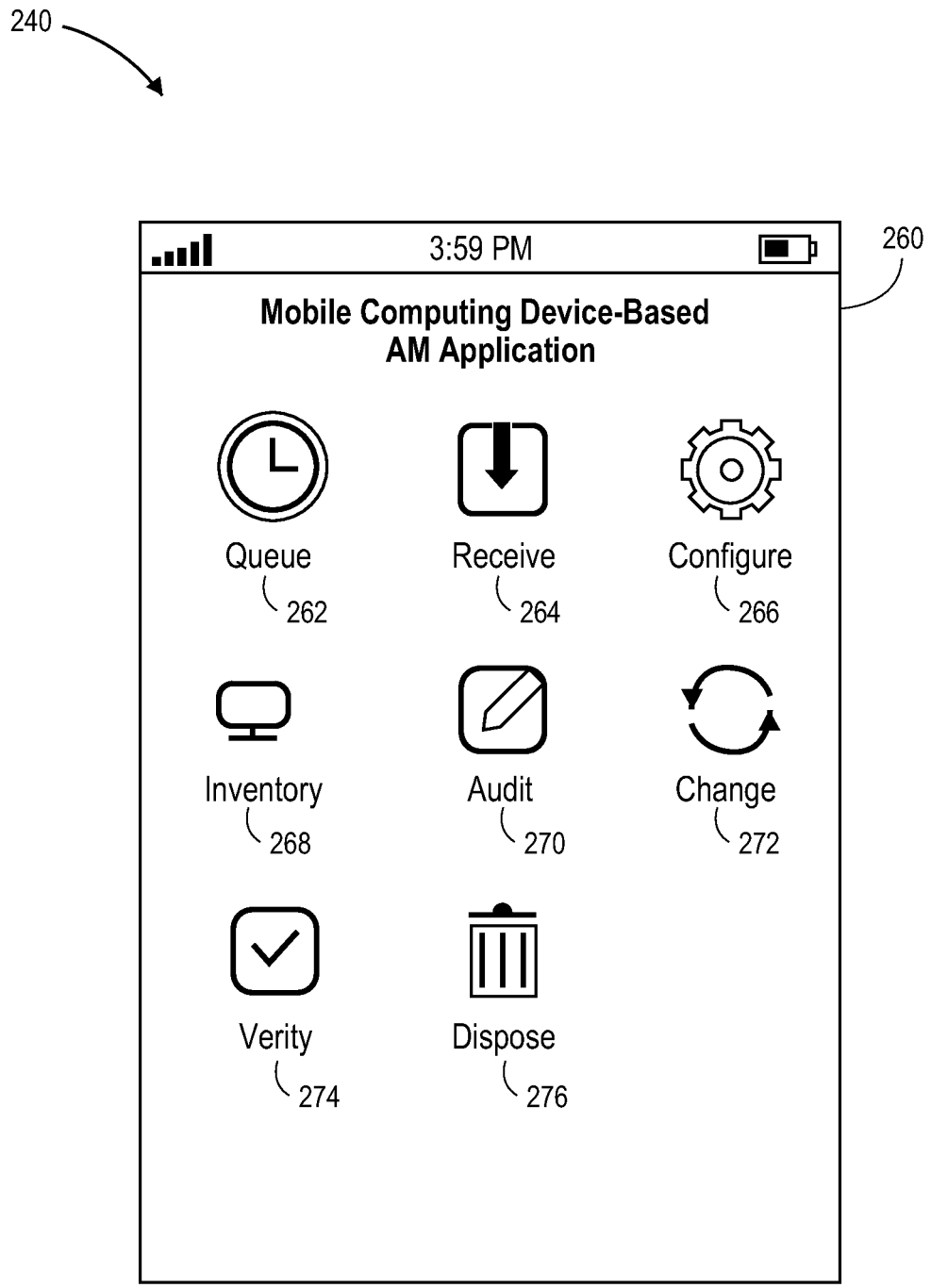
FIG. 2B illustrates a mobile computing device-based asset management application interface according to one embodiment.

FIG. 2B illustrates a mobile computing device-based AM application interface 260 at a mobile device 240 according to one embodiment. In one embodiment, mobile computing device-based AM application interface ("mobile interface") 260, employed at mobile device 240, is based on and facilitated by mobile AM mechanism 242 of FIG. 2A. The illustrated mobile interface 260 may be powered or provided by user interface 258 of FIG. 2A to provide a user easy access to various options relating to asset management. It is contemplated that embodiments are not limited to the illustrated tasks or options 262-276 and any number tasks/options may be added or removed. For example, in the illustrated embodiment, the user may use dispose 276 to request disposal of an asset, but in other embodiment, "dispose" may be replaced by "trash" or "discard" or the like and additional options, such as "transfer" or "move" or the like, may be provided.

Other illustrated options include queue 262 to, for example, allow the user to check up on the status of an asset in one or more queues (e.g., request queue) and similarly, additional options include receive 264 to, for example, allow the user to receive information (e.g., notification) relating to an asset, configure 266 to, for example, configure or customize settings (e.g., personal profile, asset processing priorities, etc.), inventory 268 to, for example, check on the status of the existing inventory, audit 270 to, for example, audit the inventory, change 272 to, for example, change any relevant information, data, path, process, etc., verify 274 to, for example, verify a contact, a transaction, a process status, etc.

FIGS. 2C and 2D illustrate asset management details according to one embodiment. It is contemplated that embodiments are not limited to the illustrated asset management details 280 and that they are merely provided as an example. For example, management of assets include managing data relating to an asset ranging from, for example, asset details 285, location information 286, data center engineering host and port information 287, acquisition information 288, support information 290, COA information 292, miscellaneous or about 294, etc.

More particularly, some of the data may include asset name 295, asset category 296, location city 297, purchase order (PO) number 298, acquisition type 299, and the like. Further, various user options, such as edit 281, delete 282, clone 283 and sharing 284 may be provided to perform various processes, such as editing, deletion, cloning, sharing, respectively, relating to data and/or processes relating to management of assets.

Figure 3:
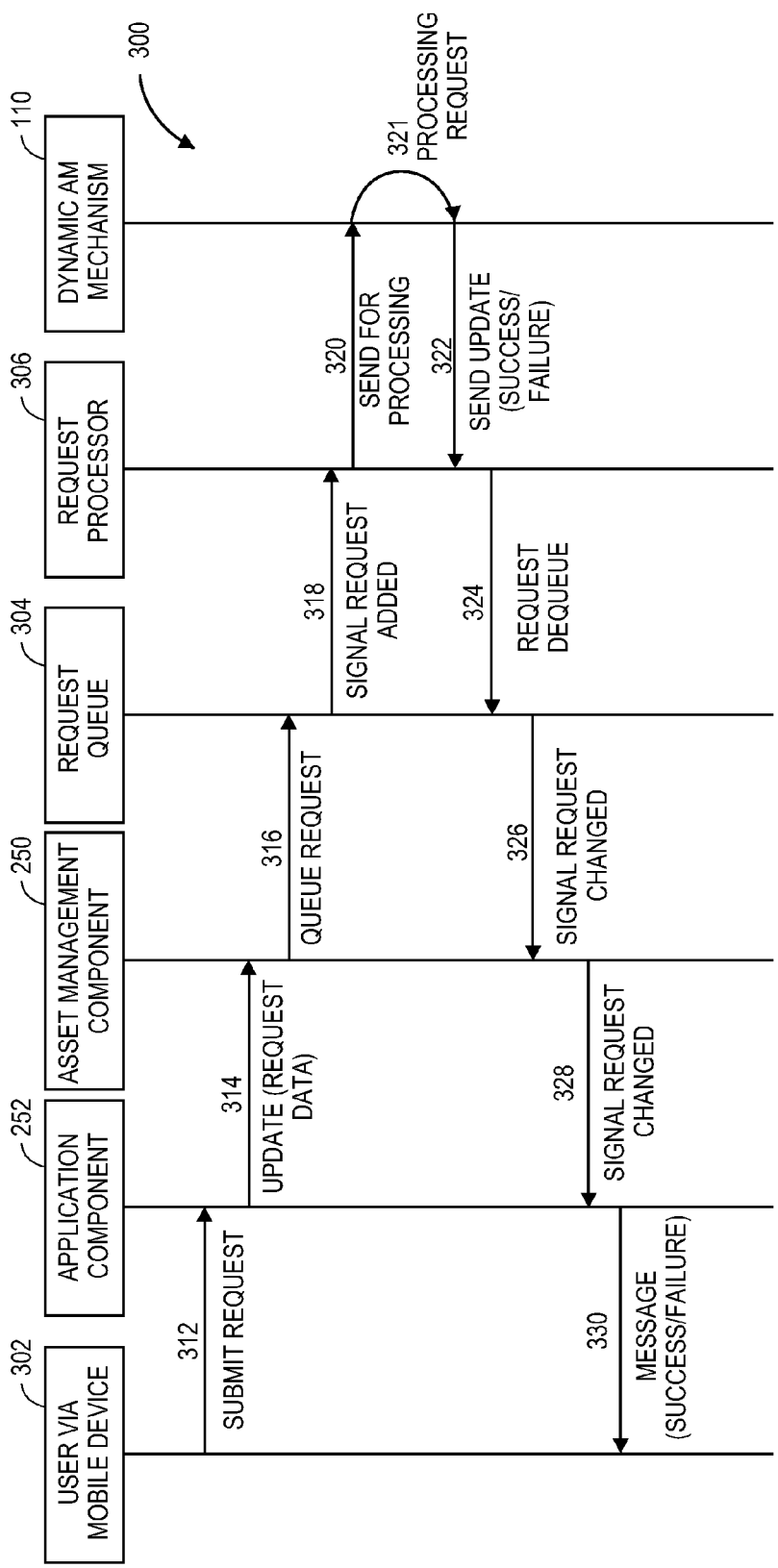
FIG. 3 illustrates a transaction sequence for performing dynamic asset management according to one embodiment.

FIG. 3 illustrates a transaction sequence 300 for performing dynamic asset management according to one embodiment. Transaction sequence 300 may be performed by processing logic that may comprise hardware (e.g., circuitry, dedicated logic, programmable logic, etc.), software (such as instructions run on a processing device), or a combination thereof. In one embodiment, transaction sequence 300 may be performed by dynamic AM mechanism 110 of FIG. 1. The illustrated transaction sequence 300 provides a user 302 via a mobile device (such as mobile device 240 of FIG. 2A) access to submit 312 a request relating to asset management, such as request to dispose an asset. In one embodiment, as a result of the request, information my be provided to the requesting device and/or other devices through one or more social media mechanisms.

The request is received at application component 252 where it is updated 314 with relevant information (e.g., asset category, asset retail price, etc.). The updated request is forwarded on to asset management component 250 where the request is placed 316 into a request queue 304 which signals 318 to a request processor 306 that the request has been added to the request queue 304. The queued request is then sent 320 for processing at dynamic AM mechanism 110 where it is processed 321.

Once the request has been processed, an update relating to the request (such as success or failure of the request process) is then sent 322 back to the request processor 306 which prompts the request queue 304 to de-queue 324 the request. The request is de-queued from the request queue 304 and a relevant signal is changed 326 (such as from queued to de-queued) and provided to asset management component 250 which forwards the changed signal 328 on to application component 252. Application component 252 issues a message 330 (e.g., request successful, request failed, request denied, etc.) to the mobile device which then displays the message 330 to the user 302 via a user/application interface, such as the application interface 260 of FIG. 2B. As another example, the application interface may be a social media interface that provides updates/posts/feeds/etc. from multiple sources. This may provide a more efficient and/or intuitive user experience. Also, other users and/or devices may receive information related to the asset.

Figure 4A:
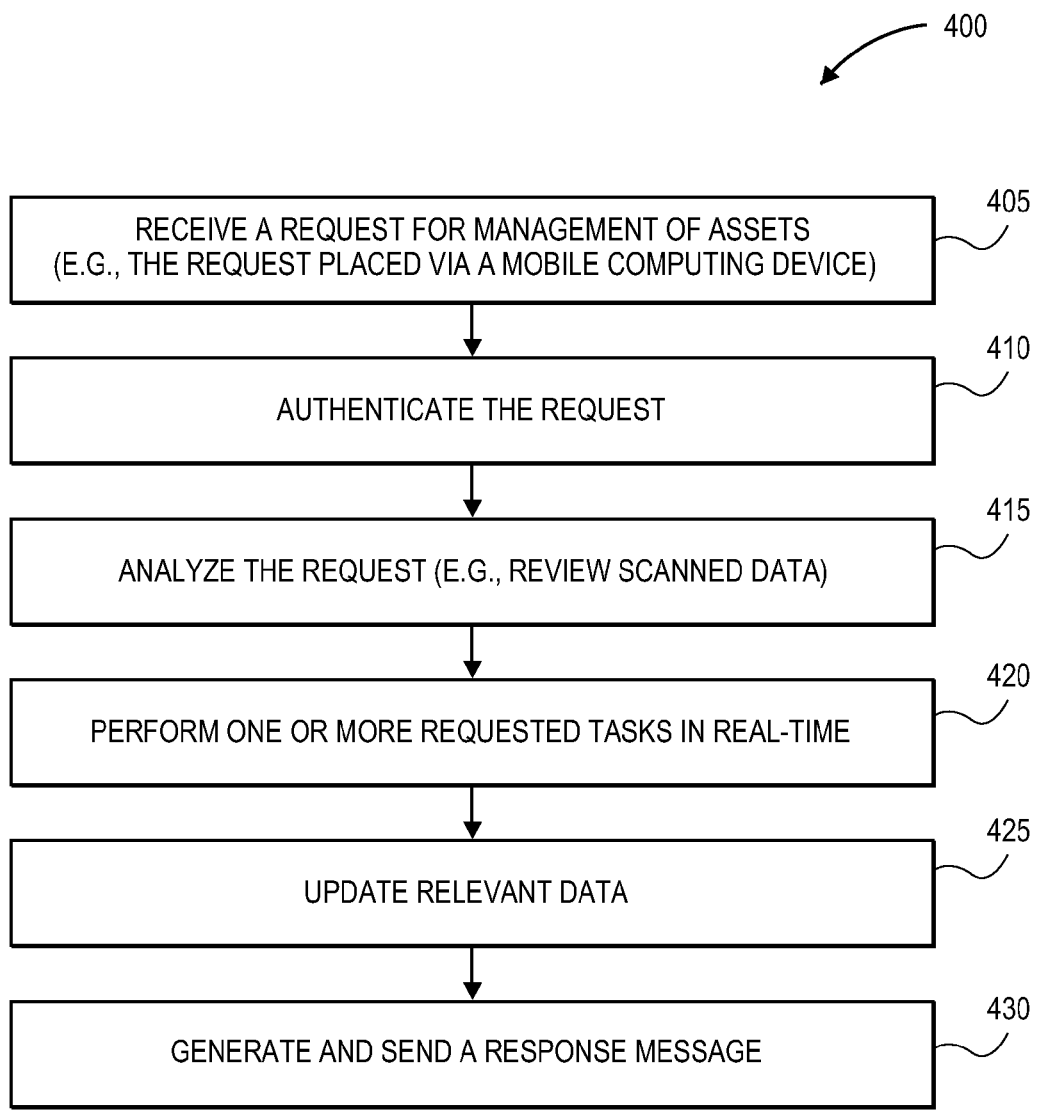
FIGS. 4A and 4B illustrate methods for performing dynamic asset management according to one embodiment.

FIG. 4A illustrates a method 400 for performing dynamic asset management according to one embodiment. Method 400 may be performed by processing logic that may comprise hardware (e.g., circuitry, dedicated logic, programmable logic, etc.), software (such as instructions run on a processing device), or a combination thereof. In one embodiment, method 400 may be performed by dynamic AM mechanism 110 of FIG. 1.

Method 400 begins at block 405 with receiving, at a server computer having the AM mechanism 110 of FIG. 1, a request for management of assets where the request may have been placed by a user using a mobile computing device (e.g., smartphone, tablet computer, etc.) having the mobile AM mechanism 242 of FIG. 2A. Upon reception, the request is authenticated, at block 410, and any relevant information is analyzed (e.g., using data scanned by the user using the mobile device's scanner) at block 415. At block 420, one or more request asset management tasks (as set forth in the request) are performed in real-time and any relevant data (e.g., asset retail price, asset movement to another location, asset disposal location, etc.) is updated at block 425. At block 430, a response relating to the request (such as indicating it success or failure) is generated and sent to the user via a social media mechanism on the mobile computing device. The response may also be sent to other users and/or devices via social media mechanisms.

Figure 4B:
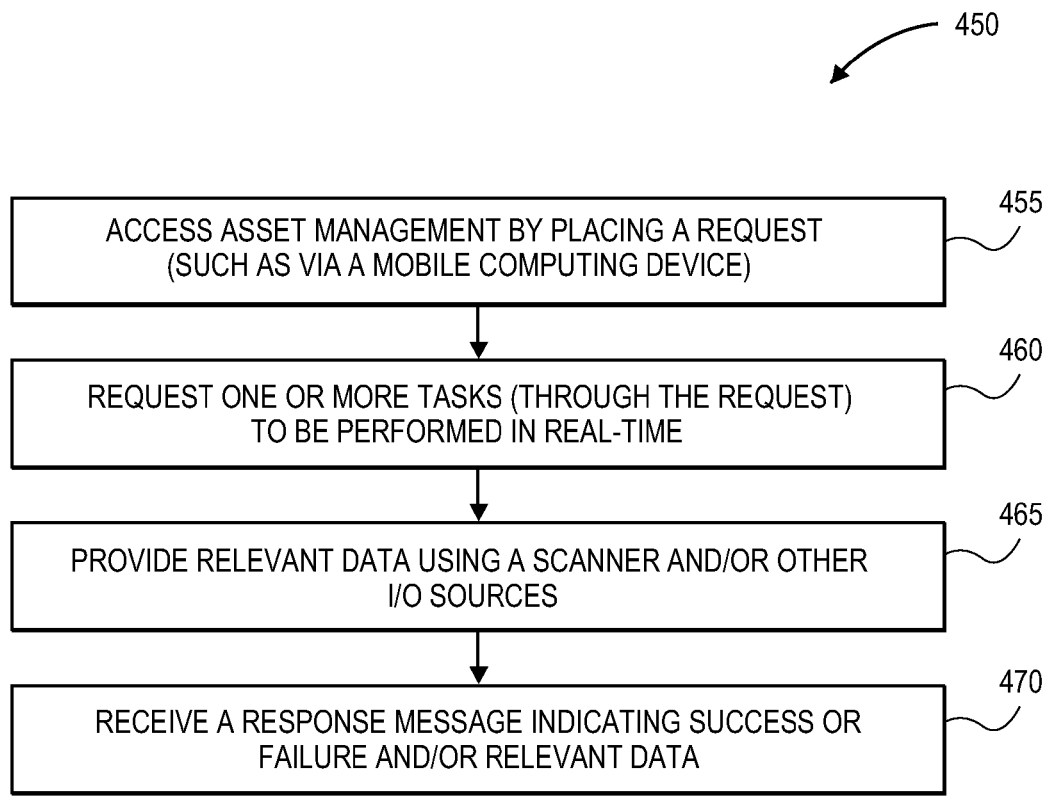

FIG. 4B illustrates a method 450 for performing dynamic asset management according to one embodiment. Method 450 may be performed by processing logic that may comprise hardware (e.g., circuitry, dedicated logic, programmable logic, etc.), software (such as instructions run on a processing device), or a combination thereof. In one embodiment, method 450 may be performed by mobile AM mechanism 242 of FIG. 2A.

Method 450 begins at block 455 with a user accessing to perform asset management by placing a request relating to asset management via a mobile computing device (e.g., smartphone, tablet computer, etc.) having the mobile AM mechanism 242 of FIG. 2A where the request is placed with a server computer having the AM mechanism 110 of FIG. 1. The user may request, via the request, one or more asset management tasks to be performed in real-time at block 460. At block 465, in one embodiment, the user may provide data relevant to the one or more requests tasks where the relevant data may obtained by scanning one or more of assets, documents relating to the assets or the one or more tasks, other items relating to the assets, etc., using a scanner of the mobile device. In another embodiment, the relevant data may be provided or inputted by the user using other forms of I/O sources (e.g., keyboard, mouse, touchpad, touchscreen, etc.).

Once the request has been processed (or denied) by the server computer, at block 470, a message relevant to the request (e.g., request successful, request failed, request denied, a counter-request requesting additional information, etc.) may be received and displayed on the mobile device for the user's benefit. In one embodiment, the message is provided via a social media mechanism and may be provided to multiple users and/or multiple devices using one or more social media mechanisms. The user may perform further action (e.g., re-submit the request, submit a new request, provided additional/requested information, etc.) based on the displayed message. It is contemplated that the message may be received in any number of ways, such as a popup, an email, a text, post, feed, chat, tweet, etc.

Figure 5:
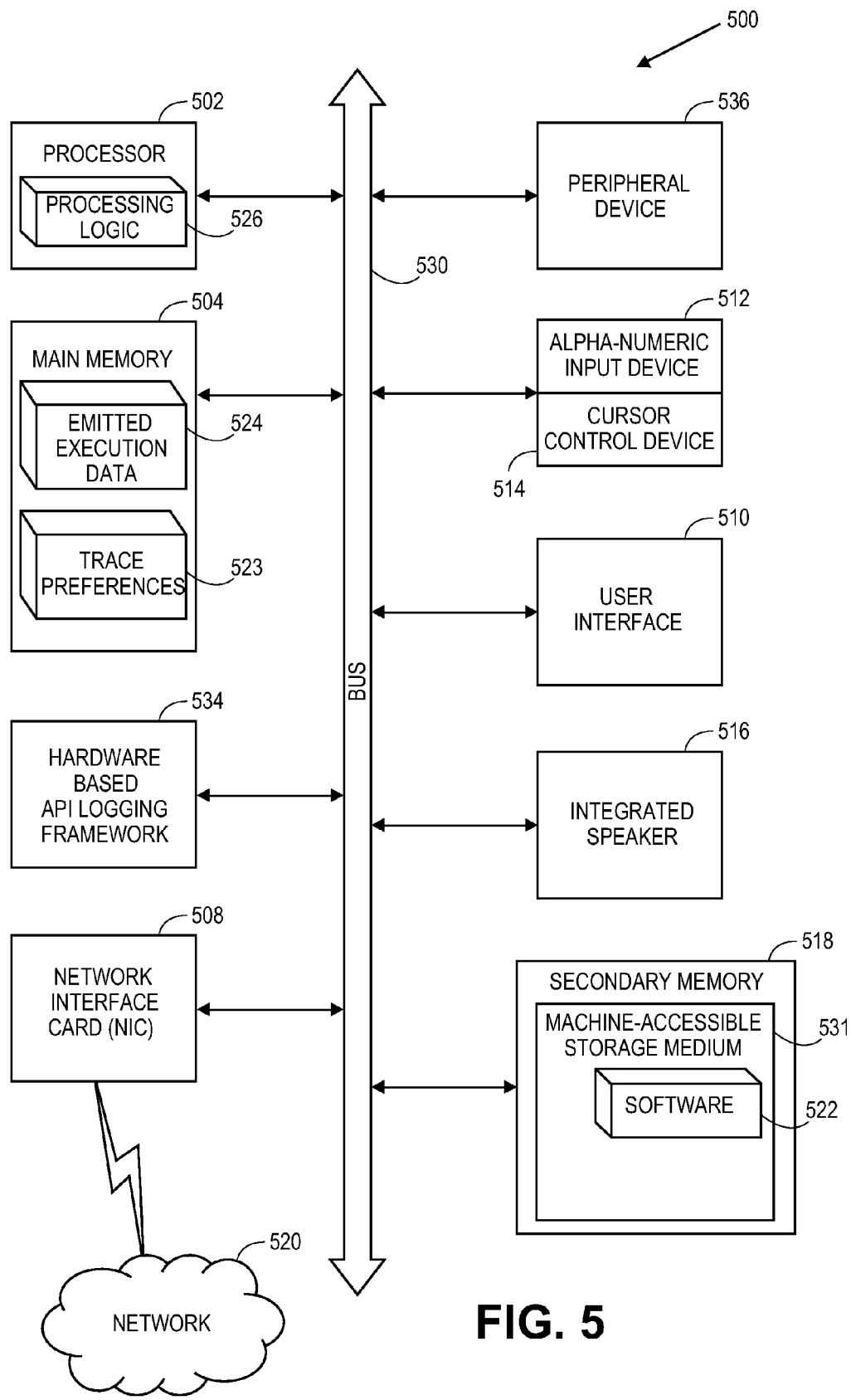
FIG. 5 illustrates a computer system according to one embodiment.

FIG. 5 illustrates a diagrammatic representation of a machine 500 in the exemplary form of a computer system, in accordance with one embodiment, within which a set of instructions, for causing the machine 500 to perform any one or more of the methodologies discussed herein, may be executed. Machine 500 is the same as or similar to computing device 100 and mobile computing device 240 of FIG. 1 and FIG. 2A, respectively. In alternative embodiments, the machine may be connected (e.g., networked) to other machines in a Local Area Network (LAN), an intranet, an extranet, or the Internet.

The machine may operate in the capacity of a server or a client machine in a client-server network environment, or as a peer machine in a peer-to-peer (or distributed) network environment or as a server or series of servers within an on-demand service environment, including an on-demand environment providing multi-tenant database storage services. Certain embodiments of the machine may be in the form of a personal computer (PC), a tablet PC, a set-top box (STB), a Personal Digital Assistant (PDA), a cellular telephone, a web appliance, a server, a network router, switch or bridge, computing system, or any machine capable of executing a set of instructions (sequential or otherwise) that specify actions to be taken by that machine. Further, while only a single machine is illustrated, the term "machine" shall also be taken to include any collection of machines (e.g., computers) that individually or jointly execute a set (or multiple sets) of instructions to perform any one or more of the methodologies discussed herein.

The exemplary computer system 500 includes a processor 502, a main memory 504 (e.g., read-only memory (ROM), flash memory, dynamic random access memory (DRAM) such as synchronous DRAM (SDRAM) or Rambus DRAM (RDRAM), etc., static memory such as flash memory, static random access memory (SRAM), volatile but high-data rate RAM, etc.), and a secondary memory 518 (e.g., a persistent storage device including hard disk drives and persistent multi-tenant data base implementations), which communicate with each other via a bus 530. Main memory 504 includes emitted execution data 524 (e.g., data emitted by a logging framework) and one or more trace preferences 523 which operate in conjunction with processing logic 526 and processor 502 to perform the methodologies discussed herein.

Processor 502 represents one or more general-purpose processing devices such as a microprocessor, central processing unit, or the like. More particularly, the processor 502 may be a complex instruction set computing (CISC) microprocessor, reduced instruction set computing (RISC) microprocessor, very long instruction word (VLIW) microprocessor, processor implementing other instruction sets, or processors implementing a combination of instruction sets. Processor 502 may also be one or more special-purpose processing devices such as an application specific integrated circuit (ASIC), a field programmable gate array (FPGA), a digital signal processor (DSP), network processor, or the like. Processor 502 is configured to execute the processing logic 526 for performing the operations and functionality of dynamic AM and remote AM mechanism s110, 242 as described with reference to FIG. 2A and other figures discussed herein.

The computer system 500 may further include a network interface card 508. The computer system 500 also may include a user interface 510 (such as a video display unit, a liquid crystal display (LCD), or a cathode ray tube (CRT)), an alphanumeric input device 512 (e.g., a keyboard), a cursor control device 514 (e.g., a mouse), and a signal generation device 516 (e.g., an integrated speaker). The computer system 500 may further include peripheral device 536 (e.g., wireless or wired communication devices, memory devices, storage devices, audio processing devices, video processing devices, etc. The computer system 500 may further include a Hardware based API logging framework 534 capable of executing incoming requests for services and emitting execution data responsive to the fulfillment of such incoming requests.

The secondary memory 518 may include a machine-readable storage medium (or more specifically a machine-accessible storage medium) 531 on which is stored one or more sets of instructions (e.g., software 522) embodying any one or more of the methodologies or functions of dynamic AM and/or remote AM mechanisms 110, 242 as described with reference to FIG. 2A and other figures described herein. The software 522 may also reside, completely or at least partially, within the main memory 504 and/or within the processor 502 during execution thereof by the computer system 500, the main memory 504 and the processor 502 also constituting machine-readable storage media. The software 522 may further be transmitted or received over a network 520 via the network interface card 508. The machine-readable storage medium 531 may include transitory or non-transitory machine-readable storage media.

Portions of various embodiments may be provided as a computer program product, which may include a computer-readable medium having stored thereon computer program instructions, which may be used to program a computer (or other electronic devices) to perform a process according to the embodiments. The machine-readable medium may include, but is not limited to, floppy diskettes, optical disks, compact disk read-only memory (CD-ROM), and magneto-optical disks, ROM, RAM, erasable programmable read-only memory (EPROM), electrically EPROM (EEPROM), mag-net or optical cards, flash memory, or other type of media/machine-readable medium suitable for storing electronic instructions.

The techniques shown in the figures can be implemented using code and data stored and executed on one or more electronic devices (e.g., an end station, a network element). Such electronic devices store and communicate (internally and/or with other electronic devices over a network) code and data using computer-readable media, such as non-transitory computer-readable storage media (e.g., magnetic disks; optical disks; random access memory; read only memory; flash memory devices; phase-change memory) and transitory computer-readable transmission media (e.g., electrical, optical, acoustical or other form of propagated signals—such as carrier waves, infrared signals, digital signals).

In addition, such electronic devices typically include a set of one or more processors coupled to one or more other components, such as one or more storage devices (non-transitory machine-readable storage media), user input/output devices (e.g., a keyboard, a touchscreen, and/or a display), and network connections. The coupling of the set of processors and other components is typically through one or more busses and bridges (also termed as bus controllers). Thus, the storage device of a given electronic device typically stores code and/or data for execution on the set of one or more processors of that electronic device. Of course, one or more parts of an embodiment may be implemented using different combinations of software, firmware, and/or hardware.

Figure 6:
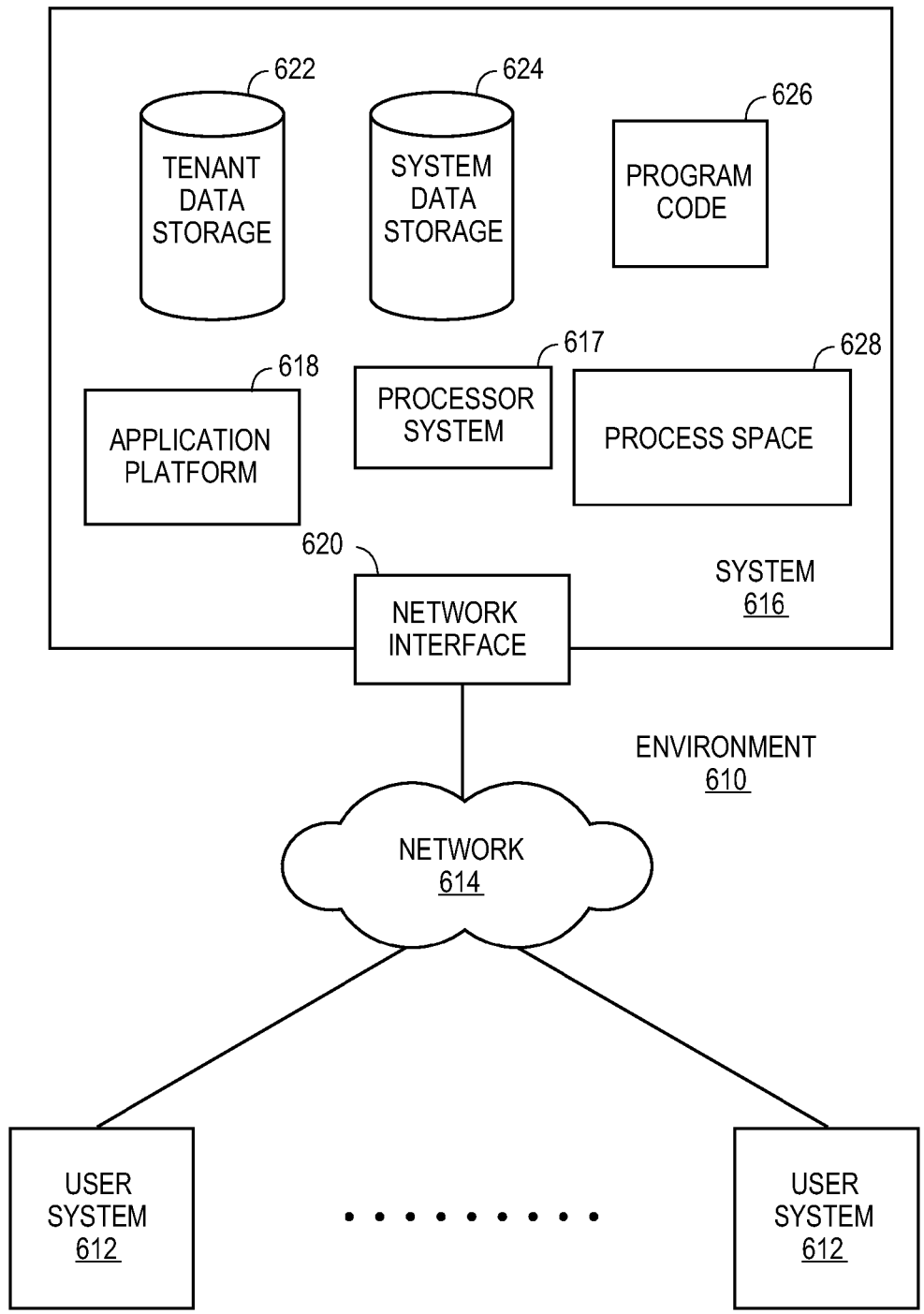
FIG. 6 illustrates a block diagram of an environment wherein an on-demand database service might be used according to one embodiment.

FIG. 6 illustrates a block diagram of an environment 610 wherein an on-demand database service might be used. Environment 610 may include user systems 612, network 614, system 616, processor system 617, application platform 618, network interface 620, tenant data storage 622, system data storage 624, program code 626, and process space 628. In other embodiments, environment 610 may not have all of the components listed and/or may have other elements instead of, or in addition to, those listed above.

Environment 610 is an environment in which an on-demand database service exists. User system 612 may be any machine or system that is used by a user to access a database user system. For example, any of user systems 612 can be a handheld computing device, a mobile phone, a laptop computer, a work station, and/or a network of computing devices. As illustrated in herein FIG. 6 (and in more detail in FIG. 7) user systems 612 might interact via a network 614 with an on-demand database service, which is system 616.

An on-demand database service, such as system 616, is a database system that is made available to outside users that do not need to necessarily be concerned with building and/or maintaining the database system, but instead may be available for their use when the users need the database system (e.g., on the demand of the users). Some on-demand database services may store information from one or more tenants stored into tables of a common database image to form a multi-tenant database system (MTS). Accordingly, "on-demand database service 616" and "system 616" will be used interchangeably herein. A database image may include one or more database objects. A relational database management system (RDMS) or the equivalent may execute storage and retrieval of information against the database object(s). Application platform 618 may be a framework that allows the applications of system 616 to run, such as the hardware and/or software, e.g., the operating system. In an embodiment, on-demand database service 616 may include an application platform 618 that enables creation, managing and executing one or more applications developed by the provider of the on-demand database service, users accessing the on-demand database service via user systems 612, or third party application developers accessing the on-demand database service via user systems 612.

The users of user systems 612 may differ in their respective capacities, and the capacity of a particular user system 612 might be entirely determined by permissions (permission levels) for the current user. For example, where a salesperson is using a particular user system 612 to interact with system 616, that user system has the capacities allotted to that salesperson. However, while an administrator is using that user system to interact with system 616, that user system has the capacities allotted to that administrator. In systems with a hierarchical role model, users at one permission level may have access to applications, data, and database information accessible by a lower permission level user, but may not have access to certain applications, database information, and data accessible by a user at a higher permission level. Thus, different users will have different capabilities with regard to accessing and modifying application and database information, depending on a user's security or permission level.

Network 614 is any network or combination of networks of devices that communicate with one another. For example, network 614 can be any one or any combination of a LAN (local area network), WAN (wide area network), telephone network, wireless network, point-to-point network, star network, token ring network, hub network, or other appropriate configuration. As the most common type of computer network in current use is a TCP/IP (Transfer Control Protocol and Internet Protocol) network, such as the global internetwork of networks often referred to as the "Internet" with a capital "I," that network will be used in many of the examples herein. However, it should be understood that the networks that one or more implementations might use are not so limited, although TCP/IP is a frequently implemented protocol.

User systems 612 might communicate with system 616 using TCP/IP and, at a higher network level, use other common Internet protocols to communicate, such as HTTP, FTP, AFS, WAP, etc. In an example where HTTP is used, user system 612 might include an HTTP client commonly referred to as a "browser" for sending and receiving HTTP messages to and from an HTTP server at system 616. Such an HTTP server might be implemented as the sole network interface between system 616 and network 614, but other techniques might be used as well or instead. In some implementations, the interface between system 616 and network 614 includes load sharing functionality, such as round-robin HTTP request distributors to balance loads and distribute incoming HTTP requests evenly over a plurality of servers. At least as for the users that are accessing that server, each of the plurality of servers has access to the MTS' data; however, other alternative configurations may be used instead.

In one embodiment, system 616, shown in FIG. 6, implements a web-based customer relationship management (CRM) system. For example, in one embodiment, system 616 includes application servers configured to implement and execute CRM software applications as well as provide related data, code, forms, webpages and other information to and from user systems 612 and to store to, and retrieve from, a database system related data, objects, and Webpage content. With a multi-tenant system, data for multiple tenants may be stored in the same physical database object, however, tenant data typically is arranged so that data of one tenant is kept logically separate from that of other tenants so that one tenant does not have access to another tenant's data, unless such data is expressly shared. In certain embodiments, system 616 implements applications other than, or in addition to, a CRM application. For example, system 616 may provide tenant access to multiple hosted (standard and custom) applications, including a CRM application. User (or third party developer) applications, which may or may not include CRM, may be supported by the application platform 618, which manages creation, storage of the applications into one or more database objects and executing of the applications in a virtual machine in the process space of the system 616.

One arrangement for elements of system 616 is shown in FIG. 6, including a network interface 620, application platform 618, tenant data storage 622 for tenant data 623, system data storage 624 for system data 625 accessible to system 616 and possibly multiple tenants, program code 626 for implementing various functions of system 616, and a process space 628 for executing MTS system processes and tenant-specific processes, such as running applications as part of an application hosting service. Additional processes that may execute on system 616 include database indexing processes.

Several elements in the system shown in FIG. 6 include conventional, well-known elements that are explained only briefly here. For example, each user system 612 could include a desktop personal computer, workstation, laptop, PDA, cell phone, or any wireless access protocol (WAP) enabled device or any other computing device capable of interfacing directly or indirectly to the Internet or other network connection. User system 612 typically runs an HTTP client, e.g., a browsing program, such as Microsoft's Internet Explorer browser, Netscape's Navigator browser, Opera's browser, or a WAP-enabled browser in the case of a cell phone, PDA or other wireless device, or the like, allowing a user (e.g., subscriber of the multi-tenant database system) of user system 612 to access, process and view information, pages and applications available to it from system 616 over network 614. Each user system 612 also typically includes one or more user interface devices, such as a keyboard, a mouse, trackball, touch pad, touch screen, pen or the like, for interacting with a graphical user interface (GUI) provided by the browser on a display (e.g., a monitor screen, LCD display, etc.) in conjunction with pages, forms, applications and other information provided by system 616 or other systems or servers. For example, the user interface device can be used to access data and applications hosted by system 616, and to perform searches on stored data, and otherwise allow a user to interact with various GUI pages that may be presented to a user. As discussed above, embodiments are suitable for use with the Internet, which refers to a specific global internetwork of networks. However, it should be understood that other networks can be used instead of the Internet, such as an intranet, an extranet, a virtual private network (VPN), a non-TCP/IP based network, any LAN or WAN or the like.

According to one embodiment, each user system 612 and all of its components are operator configurable using applications, such as a browser, including computer code run using a central processing unit such as an Intel Pentium® processor or the like. Similarly, system 616 (and additional instances of an MTS, where more than one is present) and all of their components might be operator configurable using application(s) including computer code to run using a central processing unit such as processor system 617, which may include an Intel Pentium® processor or the like, and/or multiple processor units. A computer program product embodiment includes a machine-readable storage medium (media) having instructions stored thereon/in which can be used to program a computer to perform any of the processes of the embodiments described herein. Computer code for operating and configuring system 616 to intercommunicate and to process webpages, applications and other data and media content as described herein are preferably downloaded and stored on a hard disk, but the entire program code, or portions thereof, may also be stored in any other volatile or non-volatile memory medium or device as is well known, such as a ROM or RAM, or provided on any media capable of storing program code, such as any type of rotating media including floppy disks, optical discs, digital versatile disk (DVD), compact disk (CD), microdrive, and magneto-optical disks, and magnetic or optical cards, nanosystems (including molecular memory ICs), or any type of media or device suitable for storing instructions and/or data. Additionally, the entire program code, or portions thereof, may be transmitted and downloaded from a software source over a transmission medium, e.g., over the Internet, or from another server, as is well known, or transmitted over any other conventional network connection as is well known (e.g., extranet, VPN, LAN, etc.) using any communication medium and protocols (e.g., TCP/IP, HTTP, HTTPS, Ethernet, etc.) as are well known. It will also be appreciated that computer code for implementing embodiments can be implemented in any programming language that can be executed on a client system and/or server or server system such as, for example, C, C++, HTML, any other markup language, Java™, JavaScript, ActiveX, any other scripting language, such as VBScript, and many other programming languages as are well known may be used. (Java™ is a trademark of Sun Microsystems, Inc.).

According to one embodiment, each system 616 is configured to provide webpages, forms, applications, data and media content to user (client) systems 612 to support the access by user systems 612 as tenants of system 616. As such, system 616 provides security mechanisms to keep each tenant's data separate unless the data is shared. If more than one MTS is used, they may be located in close proximity to one another (e.g., in a server farm located in a single building or campus), or they may be distributed at locations remote from one another (e.g., one or more servers located in city A and one or more servers located in city B). As used herein, each MTS could include one or more logically and/or physically connected servers distributed locally or across one or more geographic locations. Additionally, the term "server" is meant to include a computer system, including processing hardware and process space(s), and an associated storage system and database application (e.g., OODBMS or RDBMS) as is well known in the art. It should also be understood that "server system" and "server" are often used interchangeably herein. Similarly, the database object described herein can be implemented as single databases, a distributed database, a collection of distributed databases, a database with redundant online or offline backups or other redundancies, etc., and might include a distributed database or storage network and associated processing intelligence.

Figure 7:
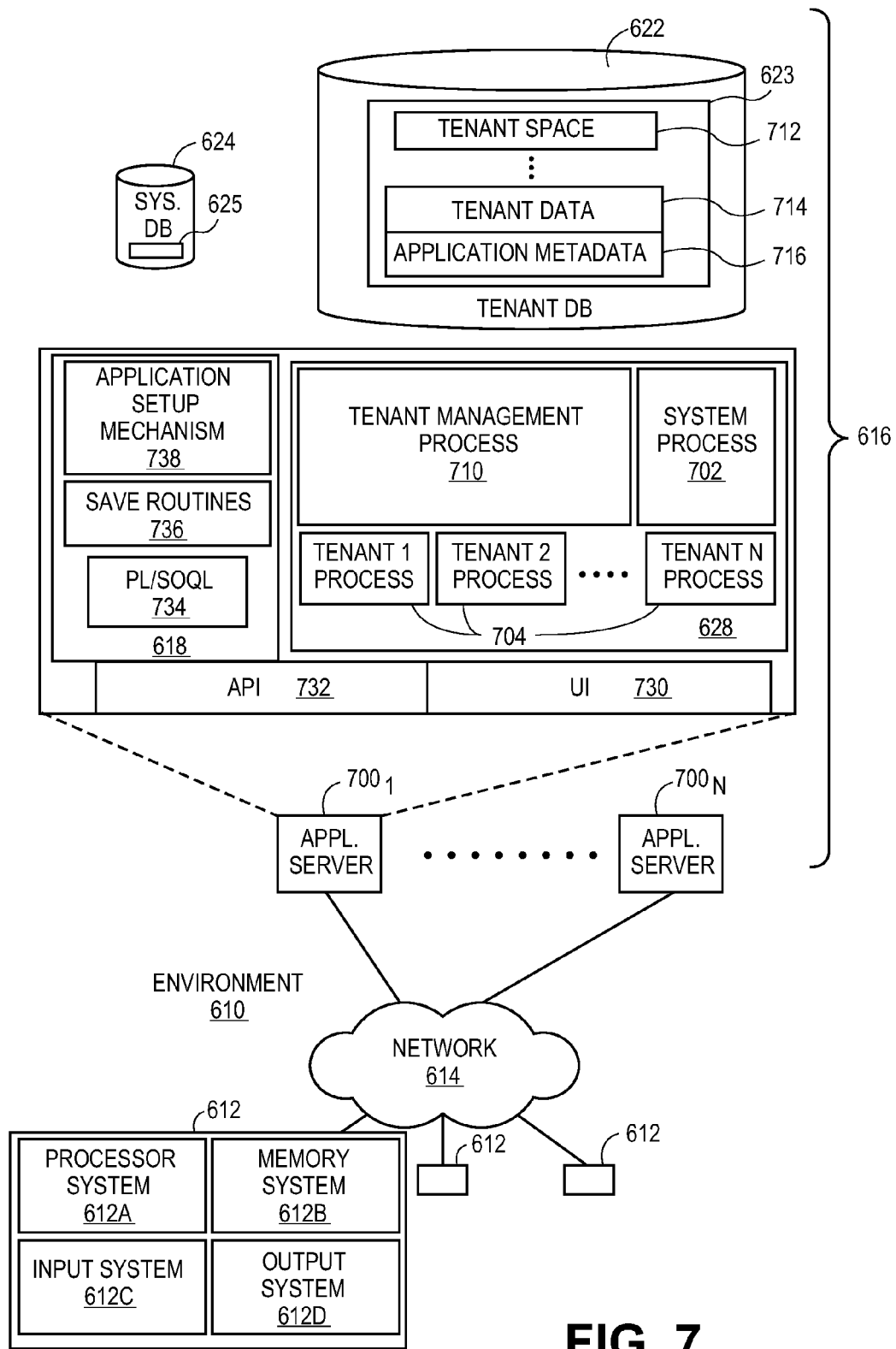
FIG. 7 illustrates a block diagram of an embodiment of elements of environment of FIG. 6 and various possible interconnections between these elements according to one embodiment.

FIG. 7 also illustrates environment 610. However, in FIG. 7 elements of system 616 and various interconnections in an embodiment are further illustrated. FIG. 7 shows that user system 612 may include processor system 612A, memory system 612B, input system 612C, and output system 612D. FIG. 7 shows network 614 and system 616. FIG. 7 also shows that system 616 may include tenant data storage 622, tenant data 623, system data storage 624, system data 625, User Interface (UI) 730, Application Program Interface (API) 732, PL/SOQL 734, save routines 736, application setup mechanism 738, applications servers $700_1$-$700_N$, system process space 702, tenant process spaces 704, tenant management process space 710, tenant storage area 712, user storage 714, and application metadata 716. In other embodiments, environment 610 may not have the same elements as those listed above and/or may have other elements instead of, or in addition to, those listed above.

User system 612, network 614, system 616, tenant data storage 622, and system data storage 624 were discussed above in FIG. 6. Regarding user system 612, processor system 612A may be any combination of one or more processors. Memory system 612B may be any combination of one or more memory devices, short term, and/or long term memory. Input system 612C may be any combination of input devices, such as one or more keyboards, mice, trackballs, scanners, cameras, and/or interfaces to networks. Output system 612D may be any combination of output devices, such as one or more monitors, printers, and/or interfaces to networks. As shown by FIG. 7, system 616 may include a network interface 620 (of FIG. 6) implemented as a set of HTTP application servers 700, an application platform 618, tenant data storage 622, and system data storage 624. Also shown is system process space 702, including individual tenant process spaces 704 and a tenant management process space 710. Each application server 700 may be configured to tenant data storage 622 and the tenant data 623 therein, and system data storage 624 and the system data 625 therein to serve requests of user systems 612. The tenant data 623 might be divided into individual tenant storage areas 712, which can be either a physical arrangement and/or a logical arrangement of data. Within each tenant storage area 712, user storage 714 and application metadata 716 might be similarly allocated for each user. For example, a copy of a user's most recently used (MRU) items might be stored to user storage 714. Similarly, a copy of MRU items for an entire organization that is a tenant might be stored to tenant storage area 712. A UI 730 provides a user interface and an API 732 provides an application programmer interface to system 616 resident processes to users and/or developers at user systems 612. The tenant data and the system data may be stored in various databases, such as one or more Oracle™ databases.

Application platform 618 includes an application setup mechanism 738 that supports application developers' creation and management of applications, which may be saved as metadata into tenant data storage 622 by save routines 736 for execution by subscribers as one or more tenant process spaces 704 managed by tenant management process 710 for example. Invocations to such applications may be coded using PL/SOQL 734 that provides a programming language style interface extension to API 732. A detailed description of some PL/SOQL language embodiments is discussed in commonly owned U.S. Pat. No. 7,730,478 entitled, "Method and System for Allowing Access to Developed Applicants via a Multi-Tenant Database On-Demand Database Service", issued Jun. 1, 2010 to Craig Weissman, which is incorporated in its entirety herein for all purposes. Invocations to applications may be detected by one or more system processes, which manage retrieving application metadata 716 for the subscriber making the invocation and executing the metadata as an application in a virtual machine.

Each application server 700 may be communicably coupled to database systems, e.g., having access to system data 625 and tenant data 623, via a different network connection. For example, one application server $700_1$ might be coupled via the network 614 (e.g., the Internet), another application server $700_{N-1}$ might be coupled via a direct network link, and another application server $700_N$ might be coupled by yet a different network connection. Transfer Control Protocol and Internet Protocol (TCP/IP) are typical protocols for communicating between application servers 700 and the database system. However, it will be apparent to one skilled in the art that other transport protocols may be used to optimize the system depending on the network interconnect used.

In certain embodiments, each application server 700 is configured to handle requests for any user associated with any organization that is a tenant. Because it is desirable to be able to add and remove application servers from the server pool at any time for any reason, there is preferably no server affinity for a user and/or organization to a specific application server 700. In one embodiment, therefore, an interface system implementing a load balancing function (e.g., an F5 Big-IP load balancer) is communicably coupled between the application servers 700 and the user systems 612 to distribute requests to the application servers 700. In one embodiment, the load balancer uses a least connections algorithm to route user requests to the application servers 700. Other examples of load balancing algorithms, such as round robin and observed response time, also can be used. For example, in certain embodiments, three consecutive requests from the same user could hit three different application servers 700, and three requests from different users could hit the same application server 700. In this manner, system 616 is multi-tenant, wherein system 616 handles storage of, and access to, different objects, data and applications across disparate users and organizations.

As an example of storage, one tenant might be a company that employs a sales force where each salesperson uses system 616 to manage their sales process. Thus, a user might maintain contact data, leads data, customer follow-up data, performance data, goals and progress data, etc., all applicable to that user's personal sales process (e.g., in tenant data storage 622). In an example of a MTS arrangement, since all of the data and the applications to access, view, modify, report, transmit, calculate, etc., can be maintained and accessed by a user system having nothing more than network access, the user can manage his or her sales efforts and cycles from any of many different user systems. For example, if a salesperson is visiting a customer and the customer has Internet access in their lobby, the salesperson can obtain critical updates as to that customer while waiting for the customer to arrive in the lobby.

While each user's data might be separate from other users' data regardless of the employers of each user, some data might be organization-wide data shared or accessible by a plurality of users or all of the users for a given organization that is a tenant. Thus, there might be some data structures managed by system 616 that are allocated at the tenant level while other data structures might be managed at the user level. Because an MTS might support multiple tenants including possible competitors, the MTS should have security protocols that keep data, applications, and application use separate. Also, because many tenants may opt for access to an MTS rather than maintain their own system, redundancy, up-time, and backup are additional functions that may be implemented in the MTS. In addition to user-specific data and tenant specific data, system 616 might also maintain system level data usable by multiple tenants or other data. Such system level data might include industry reports, news, postings, and the like that are sharable among tenants.

In certain embodiments, user systems 612 (which may be client systems) communicate with application servers 700 to request and update system-level and tenant-level data from system 616 that may require sending one or more queries to tenant data storage 622 and/or system data storage 624. System 616 (e.g., an application server 700 in system 616) automatically generates one or more SQL statements (e.g., one or more SQL queries) that are designed to access the desired information. System data storage 624 may generate query plans to access the requested data from the database.

Each database can generally be viewed as a collection of objects, such as a set of logical tables, containing data fitted into predefined categories. A "table" is one representation of a data object, and may be used herein to simplify the conceptual description of objects and custom objects. It should be understood that "table" and "object" may be used interchangeably herein. Each table generally contains one or more data categories logically arranged as columns or fields in a viewable schema. Each row or record of a table contains an instance of data for each category defined by the fields. For example, a CRM database may include a table that describes a customer with fields for basic contact information such as name, address, phone number, fax number, etc. Another table might describe a purchase order, including fields for information such as customer, product, sale price, date, etc. In some multi-tenant database systems, standard entity tables might be provided for use by all tenants. For CRM database applications, such standard entities might include tables for Account, Contact, Lead, and Opportunity data, each containing pre-defined fields. It should be understood that the word "entity" may also be used interchangeably herein with "object" and "table".

In some multi-tenant database systems, tenants may be allowed to create and store custom objects, or they may be allowed to customize standard entities or objects, for example by creating custom fields for standard objects, including custom index fields. U.S. patent application Ser. No. 10/817,161, filed Apr. 2, 2004, entitled "Custom Entities and Fields in a Multi-Tenant Database System", and which is hereby incorporated herein by reference, teaches systems and methods for creating custom objects as well as customizing standard objects in a multi-tenant database system. In certain embodiments, for example, all custom entity data rows are stored in a single multi-tenant physical table, which may contain multiple logical tables per organization. It is transparent to customers that their multiple "tables" are in fact stored in one large table or that their data may be stored in the same table as the data of other customers.

Any of the above embodiments may be used alone or together with one another in any combination. Embodiments encompassed within this specification may also include embodiments that are only partially mentioned or alluded to or are not mentioned or alluded to at all in this brief summary or in the abstract. Although various embodiments may have been motivated by various deficiencies with the prior art, which may be discussed or alluded to in one or more places in the specification, the embodiments do not necessarily address any of these deficiencies. In other words, different embodiments may address different deficiencies that may be discussed in the specification. Some embodiments may only partially address some deficiencies or just one deficiency that may be discussed in the specification, and some embodiments may not address any of these deficiencies.

While one or more implementations have been described by way of example and in terms of the specific embodiments, it is to be understood that one or more implementations are not limited to the disclosed embodiments. To the contrary, it is intended to cover various modifications and similar arrangements as would be apparent to those skilled in the art. Therefore, the scope of the appended claims should be accorded the broadest interpretation so as to encompass all such modifications and similar arrangements. It is to be understood that the above description is intended to be illustrative, and not restrictive.

What is claimed is:

1. A method of facilitating a computerized asset management system for a plurality of hardware assets of software assets in a system having a plurality of users with at least some of the users having different roles in the system, the method comprising:
- receiving at the computerized asset management system a request for performance of one or more tasks relating to management of data relating to assets, wherein management of the asset comprises at least management of data relating to the asset in the computerized asset management system;
- performing automatically at least in part in the computerized asset management system the one or more tasks comprising at least dynamically customizing, according to the request, data relating to the assets; and
- generating automatically at least in part in the computerized asset management system feed information including identifier information identifying at least one of the users, the asset and the task, the information being generated depending upon the role of the user in the system and the feed information being suitable when received by a social media mechanism having a real-time news stream that allows user to follow others and to post messages to the news stream to generate a feed of human readable information regarding the asset management task performed, wherein the information displayed is capable of depending upon the role of the user.

2. The method of claim 1 wherein the performing the one or more tasks further comprises dynamically modifying the asset according to the request.

3. The method of claim 1 wherein a frequency of information provided via the feed is based on the role within the organization.

4. The method of claim 1 wherein the information provided via the feed is based on a lifecycle stage of the asset.

5. The method of claim 1 wherein the information provided via the feed is based on a user profile, a user preference and/or a user privilege level.

6. The method of claim 1 wherein the social media mechanism comprises a real-time collaboration platform for users, wherein the platform has a service that sends information proactively via a real-time feed stream that allows users to receive information according to their organizational role.

7. The method of claim 1 wherein the management of data relating to the asset is provided by a cloud-based asset management application.

8. The method of claim 1 wherein the information corresponding to the one or more tasks comprises at least one photograph.

9. A system comprising:
a computing device having a memory to store instructions, and a processing device to execute the instructions, wherein the instructions cause the processing device to:
- receive, in real-time, at the computerized asset management system a request for performance of one or more tasks relating to management of data relating to assets, wherein management of the asset comprises at least management of data relating to the asset in the computerized asset management system;
- perform, in real-time, automatically at least in part in the computerized asset management system the one or more tasks comprising at least dynamically customizing, according to the request, data relating to the assets; and
- generate automatically at least in part in the computerized asset management system feed information including identifier information identifying at least one of the users, the asset and the task, the information being generated depending upon the role of the user in the system and the feed information being suitable when received by a social media mechanism having a real-time news stream that allows user to follow others and to post messages to the news stream to generate a feed of human readable information regarding the asset management task performed, wherein the information displayed is capable of depending upon the role of the user.

10. The system of claim 9 wherein the performing the one or more tasks further comprises dynamically modifying the asset according to the request.

11. The system of claim 9 wherein a frequency of information provided via the feed is based on the role within the organization.

12. The system of claim 9 wherein the information provided via the feed is based on a lifecycle stage of the asset.

13. The system of claim 9 wherein the information provided via the feed is based on a user profile, a user preference and/or a user privilege level.

14. The system of claim 9 wherein the social media mechanism comprises a real-time collaboration platform for users, wherein the platform has a service that sends information proactively via a real-time feed stream that allows users to receive information according to their organizational role.

15. The system of claim 9 wherein the management of data relating to the asset is provided by a cloud-based asset management application.

16. The system of claim 9 wherein the information corresponding to the one or more tasks comprises at least one photograph.

17. An article of manufacture comprising a non-transitory computer-readable medium having stored thereon instructions that, when executed by one or more processors, cause the one or more processors to:
- receive, in real-time, at the computerized asset management system a request for performance of one or more tasks relating to management of data relating to assets, wherein management of the asset comprises at least management of data relating to the asset in the computerized asset management system;
- perform, in real-time, automatically at least in part in the computerized asset management system the one or more tasks comprising at least dynamically customizing, according to the request, data relating to the assets; and
- generate automatically at least in part in the computerized asset management system feed information including identifier information identifying at least one of the users, the asset and the task, the information being generated depending upon the role of the user in the system and the feed information being suitable when received by a social media mechanism having a real-time news stream that allows user to follow others and to post messages to the news stream to generate a feed of human readable information regarding the asset management task performed, wherein the information displayed is capable of depending upon the role of the user.

18. The medium of claim 17 wherein the instructions that cause the one or more computing platforms to perform the one or more tasks further comprise instructions that, when executed, cause the one or more computing platforms to dynamically modify the asset according to the request.

19. The medium of claim 17 wherein a frequency of information provided via the feed is based on the role within the organization.

20. The medium of claim 17 wherein the information provided via the feed is based on a lifecycle stage of the asset.

21. The medium of claim 17 wherein the information provided via the feed is based on a user profile, a user preference and/or a user privilege level.

22. The medium of claim 17 wherein the social media mechanism comprises a real-time collaboration platform for users, wherein the platform has a service that sends information proactively via a real-time feed stream that allows users to receive information according to their organizational role.

23. The medium of claim 17 wherein the management of data relating to the asset is provided by a cloud-based asset management application.

24. The medium of claim 17 wherein the information corresponding to the one or more tasks comprises at least one photograph.

* * * * *